March 21, 1950     P. M. LEWIS     2,501,227
HELICOPTER
Filed Oct. 24, 1944     3 Sheets-Sheet 1
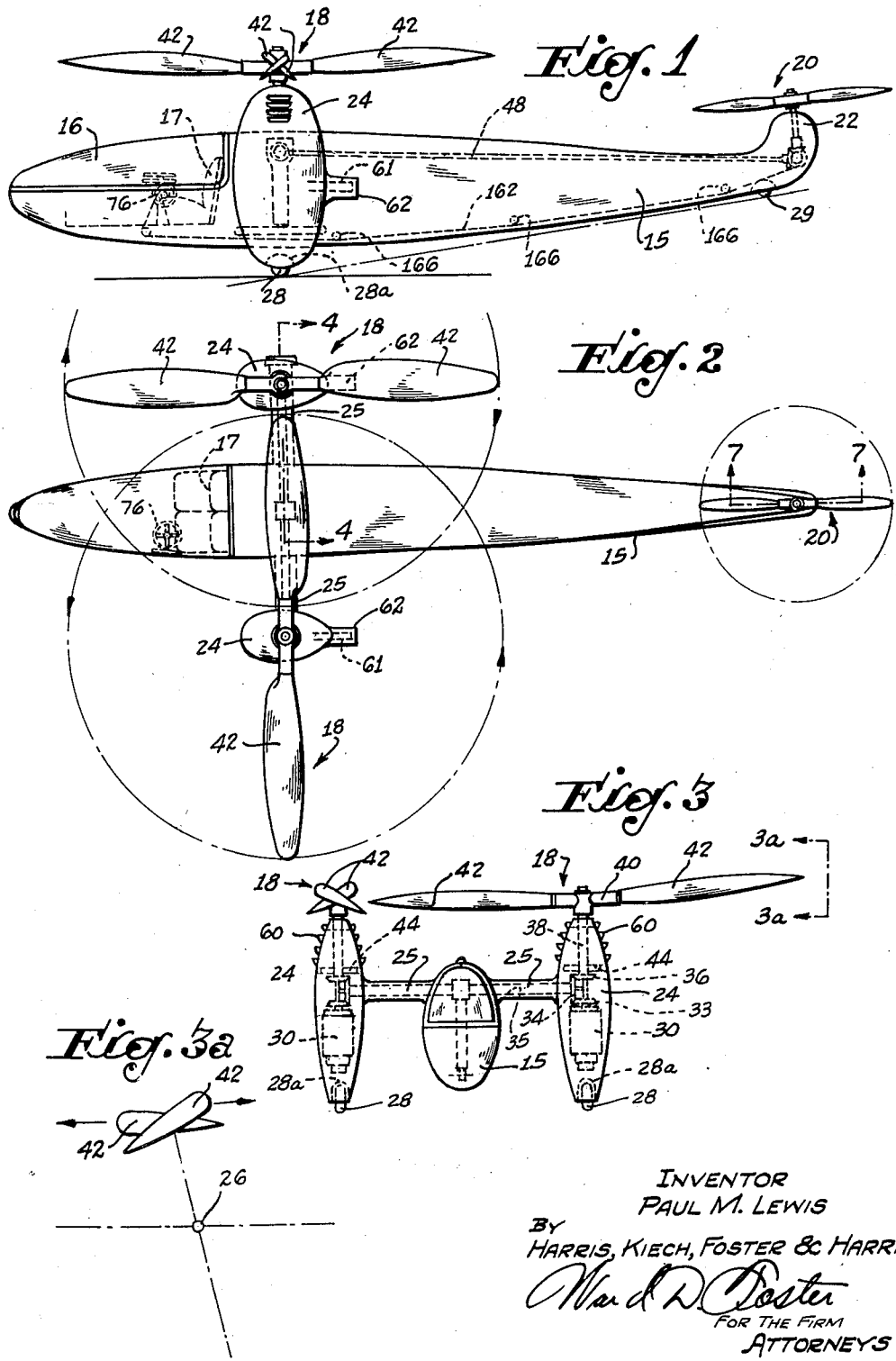
INVENTOR
PAUL M. LEWIS
BY HARRIS, KIECH, FOSTER & HARRIS
FOR THE FIRM
ATTORNEYS March 21, 1950 P. M. LEWIS 2,501,227
HELICOPTER
Filed Oct. 24, 1944 3 Sheets-Sheet 2
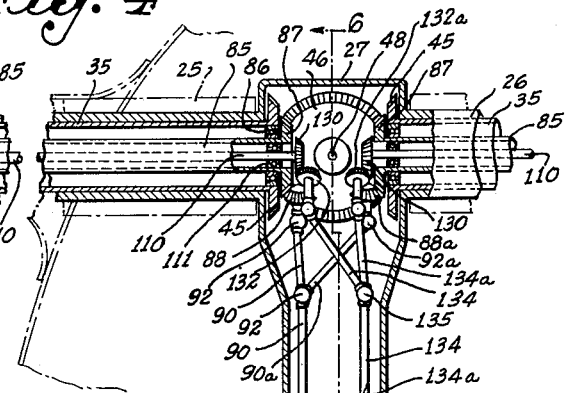
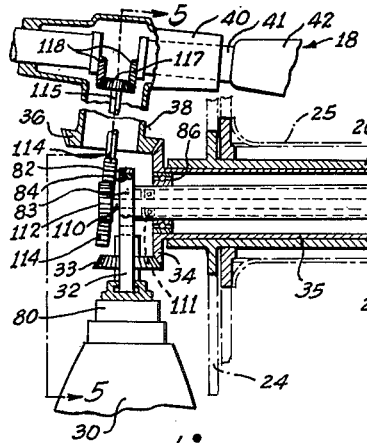
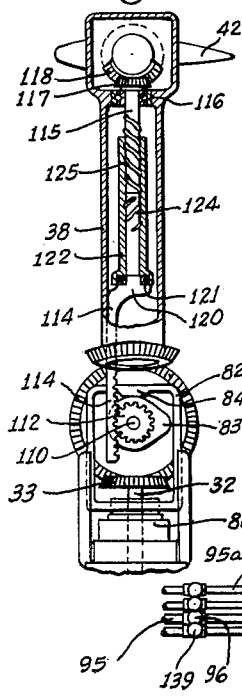
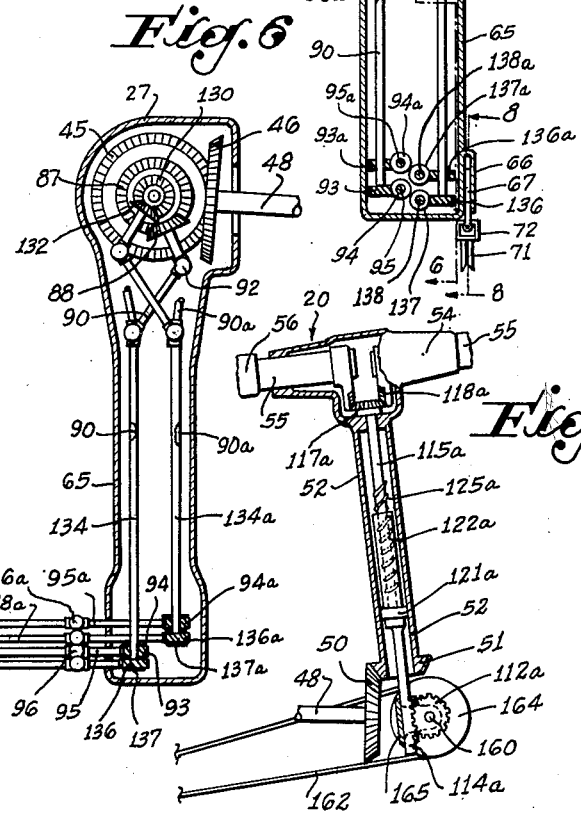
INVENTOR
PAUL M. LEWIS
BY
HARRIS, KIECH, FOSTER & HARRIS
FOR THE FIRM
ATTORNEYS March 21, 1950 P. M. LEWIS 2,501,227
HELICOPTER
Filed Oct. 24, 1944 3 Sheets-Sheet 3
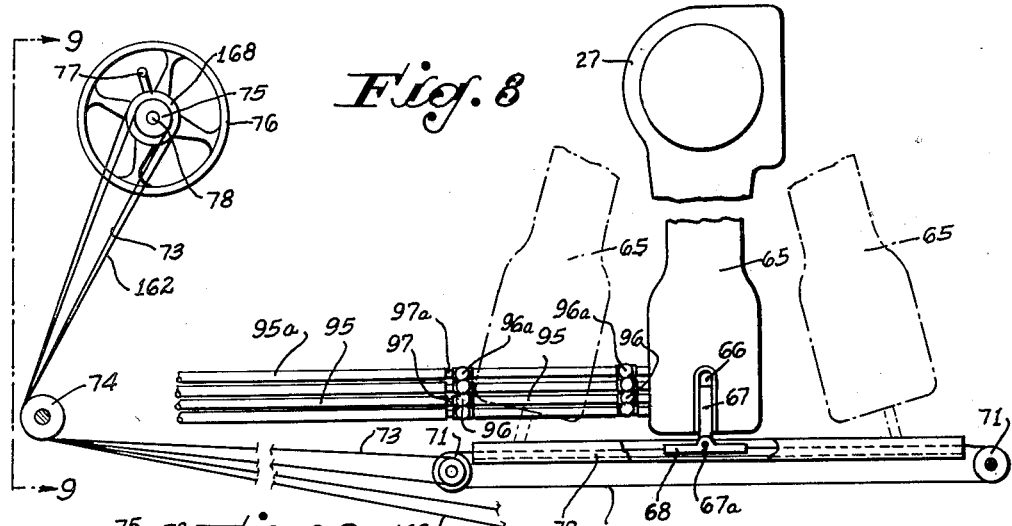
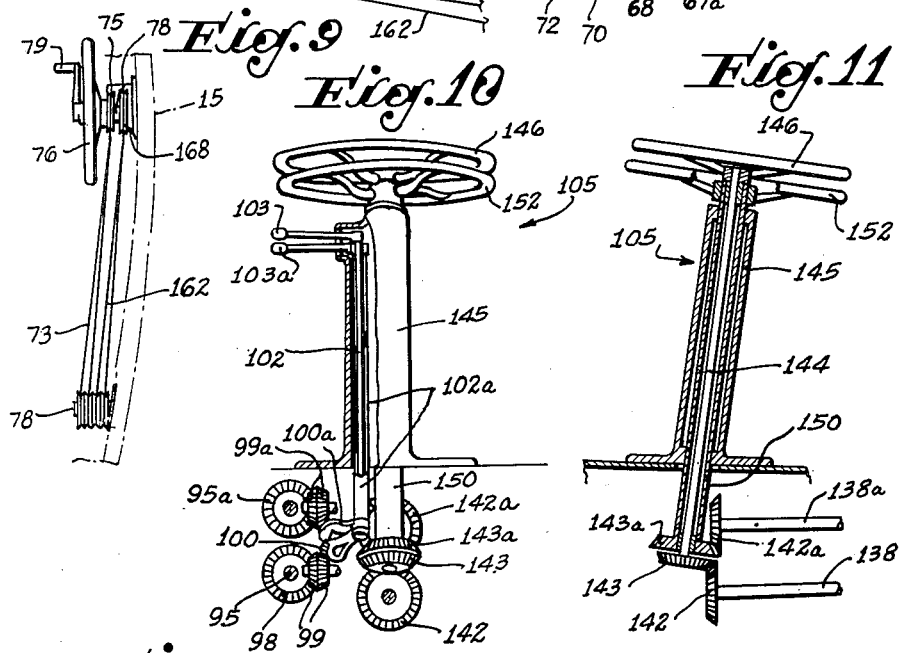
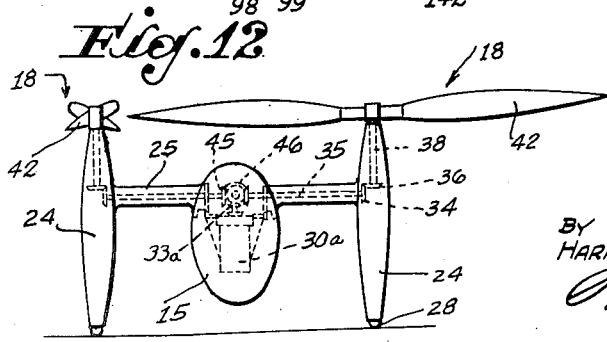
INVENTOR
PAUL M. LEWIS
BY HARRIS, KIECH, FOSTER & HARRIS
Ward D. Foster
FOR THE FIRM
ATTORNEYS Patented Mar. 21, 1950

2,501,227

UNITED STATES PATENT OFFICE 2,501,227

HELICOPTER

Paul M. Lewis, Los Angeles, Calif., assignor to Peninsular Metal Products Corporation, Detroit, Mich., a corporation of Michigan Application October 24, 1944, Serial No. 560,117

5 Claims. (Cl. 244—17.23)

This invention relates to aeronautical apparatus, and more particularly to the helicopter type of aircraft.

A general object of the invention is to provide aircraft of the helicopter type which shall be useful for civilian operation, shall be possessed of a large degree of safety, shall have good stabilizing qualities and shall have good maneuverability.

It is a further object of the invention to provide transversely spaced rotors possessing both lifting and propelling functions which are arranged upon the body or fuselage of the aircraft in a relatively compact relationship, whereby to confine the overall spread of the aircraft within modest limits. It is also an object to provide in such construction and arrangement adequate stabilizing characteristics.

It is a further object of the invention to employ rotors possessing structural characteristics similar to conventional airplane propellers, but structurally modified to provide adequate lifting surfaces for any given craft, as well as adequate propelling properties.

Another object of the invention is to provide a helicopter capable of being maneuvered solely by bodily adjustment of the positions of the rotors and adjustment of the positions of the blades of the rotors.

A further object is to provide a tail rotor so mounted and constructed as to impart adequate tail stabilization and to provide for trimming the ship.

It is a further object of the invention to provide a helicopter type of aircraft which may land upon water as well as upon the surface of the ground.

Important features of the invention are found in the employment of a pair of opposed power rotors which are in general horizontally disposed but are mounted upon vertical axes which may be tipped to change the angle of attack so that the rotors are readily adjustable for substantially vertical ascent and descent, and, upon ascent, are readily adjustable for relatively high rates of forward speed. Such axes may also be so adjustable as to provide straight line movement rearward as may be necessary in connection with parking the aircraft in a small area. An additional feature of the invention is found in the provision of housings laterally disposed at the opposite sides of the aircraft, in which housings means are mounted providing the vertical axes of the rotors, means being included therein for driving vertical shafts adapted to actuate the rotors. According to one form of the invention, these housings may include separate motors for the respective rotors. In another form of the invention one or more motors may be provided within the fuselage or body of the aircraft for actuation of the rotors. In both forms, it is preferred that the rotors and their engines be interconnected whereby an important new feature of the invention is attained which consists in synchronizing the rotors so that opposed rotors may be arraged relatively closely to each other with their blades working in partially overlapping paths, the relative dispositions of the blades being such that the blades of two cooperating rotors are interspaced and travel in alternating succession through the common portion of their paths without interference. For stabilization purposes, the rotors travel in opposite directions so that blades moving through the overlapping or common portions of their respective paths move in the same direction. Preferably, the blades, when traveling in the outermost portions of their respective paths move rearward to accomplish increased stabilization and increased forward speed, the blades being so pitched as to attain that end. In addition to the two cooperating rotors mentioned, which constitute the power rotors and are positioned forwardly of the aircraft, a feature of the invention is employing at the tail of the aircraft a single rotor also operating in a substantially horizontal plane for the purpose of stabilizing the tail of the craft. It is a further feature of the invention for the purpose of enhancing stabilization, to cant the vertical axes of the power rotors toward each other whereby to lower the overlapping portions of the paths of the power rotors and to raise the outermost portions of said paths, and it is a further feature to improve stabilization by canting the axis of the tail stabilizing rotor so that the forward portion of the path thereof is lowered somewhat. Other features of the invention are found in specific means for adjusting the positions of the axes of the power rotors, means for adjusting the longitudinal axes of the blades of the rotors to maneuver the aircraft as required and connected driving means between the various rotors.

A further feature is found in rendering the lower portion of the fuselage, and the lower portions of the housings carrying the driving means for the power rotors, water-tight, so that the craft may land upon water. For the purpose of landing the craft upon land when desired, landing wheels are provided in downwardly opening water-tight recesses in the lower extremities of the housings, tail landing means or skid means being similarly mounted upon the tail of the fuselage.

Other objects and features of the invention will be apparent to those skilled in the art to which this invention pertains, as will become evident upon reference to the accompanying drawings wherein certain embodiments of the invention are disclosed merely for the purpose of illustration.

In these drawings,

Fig. 1 is a side elevation of an assembled helicopter constructed according to the present invention;

Fig. 2 is a plan view of the construction shown in Fig. 1;

Fig. 3 is a front elevation of the structure shown in Figs. 1 and 2;

Fig. 3a shows relative blade positions when tipped in forward flight and viewed from the line 3a—3a of Fig. 3;

Fig. 4 is a fragmentary enlarged vertical transverse section taken approximately from the line 4—4 of Fig. 2;

Fig. 5 is an enlarged vertical sectional detail taken on the irregular line 5—5 of Fig. 4;

Fig. 6 is a vertical sectional detail taken on the irregular line 6—6 of Fig. 4;

Fig. 7 is a vertical detail taken approximately on the line 7—7 of Fig. 2;

Fig. 8 is an enlarged elevational detail taken as indicated by the line 8—8 of Fig. 4, showing the means and indicating the manner of rocking the vertical housings carrying the power rotors whereby to adjust the vertical axes of these rotors;

Fig. 9 is an elevational detail taken from the line 9—9 of Fig. 8, showing cable actuating means for simultaneously adjusting the axes of rotation of the power rotors and adjusting the horizontal axes of the blades of the rear stabilizing rotor;

Fig. 10 is chiefly an elevational detail of steering mechanism disposed in the cockpit of the aircraft, gear trains being shown through which the power rotors and clutches therefor are controlled;

Fig. 11 is a vertical sectional detail taken on the line 11—11 of Fig. 10, showing principally the means for controlling the pitch of the blades of the respective power rotors; and Fig. 12 is an end elevation corresponding with that of Fig. 3 and showing a modified form wherein a single engine for the two power rotors is enclosed in the fuselage of the aircraft.

In the form of helicopter construction of Figs. 1 to 11, inclusive, a fuselage 15 or conventional construction is shown as being provided at its forward portion with a suitable removable transparent hood 16 normally enclosing a cockpit in which a seat 17 for a pilot and passengers is provided adjacent to appropriate control mechanisms hereinafter described.

Arranged laterally of the forward portion of the fuselage 15 are two power rotors 18 disposed in generally horizontal positions on generally vertical axes, and at the rear of the fuselage is disposed a single, preferably relatively small stabilizing rotor 20 mounted in a special tailpiece 22 of the fuselage 15.

The two rotors 18 are carried respectively in vertically extending narrow housings 24 which enclose means constituting the axes about which the rotors 18 operate. The housings 24 are rotatably carried upon transversely extending sleeves 25 which are rigidly secured to the upper portion of the fuselage 15. Obviously, any suitable additional bracing means (not shown) may be employed if necessary or desirable. The housings 24 are adapted to be rotated about an axis extending centrally of the sleeves 25, such motion being permitted through the medium of telescoped sleeves 26 (Fig. 4) suitably journaled within the sleeves 25 and extensions thereof, the sleeves 26 being interconnected adjacent the upper middle portion of the cockpit by an enlarged connecting housing 27. Thus, when the aircraft is at rest upon the ground, the interconnecting sleeves 25 serve to support the fuselage 15 through the medium of the housings 24. Direct ground contact is provided by ground wheels 28 disposed in water-tight downwardly directed cavities 28a in the lower portions of the housings 24, and by any similarly arranged skid or ground wheel 29 provided in the tail of the fuselage 15. The lower portion of the fuselage 15 being water-tight and the lower portions of the housings 24 being water-tight, the craft may land and float upon water.

In the form of construction of Figs. 1 to 4, an engine 30 is mounted in each of the housings 24 and provided with an upright drive shaft 32 (Fig. 4) provided with a bevel drive gear 33 meshing with a bevel gear 34 carried on a hollow shaft 35 journaled in any desired manner within the sleeve 26. The bevel gear 34 in turn meshes with a bevel gear 36 on the lower end of a hollow shaft 38 secured to a hub 40 which receives journaled spindles 41 of blades 42 constituting part of the respective rotors 18. The hollow shaft 38 is mounted in any appropriate bearings 44 carried within the respective housing 24. In this manner an engine 30 operating from its shaft 32 through the gear train 33, 34 and 36 and through the hollow shaft 38 and hub 40 serves to rotate the respective rotor 18.

Through the medium of the hollow drive shaft 35 carrying the bevel gear 34 of each engine 30, the two engines 30 are maintained in synchronized relation by reason of bevel gears 45 carried on their opposite ends and disposed within the connecting housing 27. In this form of the invention the bevel gears 45 mesh with a central gear 46 carried on a shaft 48 mounted in any suitable bearings (not shown) and extending into the tail of the fuselage 15 to drive the stabilizing rotor 20, as indicated in Figs. 6 and 7. This is accomplished through the medium of a bevel gear 50 carried on the rear end of the shaft 48 and meshing with a bevel gear 51 fixed on the lower end of a hollow drive shaft 52 whose upper end is secured to a hub 54 receiving suitably journaled adjustable spindles 55 of blades 56 constituting the rear stabilizing rotor 20. The hollow drive shaft 52 is journaled in the tailpiece 22 at the rear of the fuselage 15 in any appropriate manner not indicated.

By reason of the interconnection of the two rotors 18 and the two motors 30 through the hollow drive shafts 25, the bevel gears 34 and 45 and the central bevel gear 46, the two engines 30 and the two power rotors 18 are properly synchronized so that the blades 42 of the rotors 18 are always properly disposed in interspaced relationship as they pass through the common or overlapping portions of their respective paths. Also, as will be noted by reference to Figs. 3 and 4, the axes of the power rotors 18 are inclined toward each other for the purpose of producing further stabilization of the craft. This is by reason of the fact that the propeller blades 42, as indicated especially in Fig. 1, are tipped upward as they extend outward somewhat after the fashion of standard airplane wing disposition. It is desired that the blades 42 in traveling through the overlapping portion of their paths move in the same plane to avoid undue air agitation. By tipping the axes as indicated, the blades are thus brought into the same horizontal plane as they pass above the fuselage 15, this being best indicated in Fig. 3. It will also be noted that the axis of the stabilizing rotor 20 on the tail of the fuselage 15 is tipped forward. This serves to stabilize the fuselage and at the same time to add to the propelling power.

In order to impart a desirable and convenient forced air circulation over the engines 30 through the housings 24, upwardly directed louvers 60 are provided in the upper portions of the opposing sides of the housings 24, so that the tips of the blades 42 of the opposite rotors 18, which travel at high rates of speeds as they pass above and adjacent the respective louvers 60 will tend to force air currents at high rates of speed down through the louvers and into the housings 24. At positions rearward of the engines 30, rearwardly directed nozzles 61 are provided on the housings 24, whereby a partial vacuum effect aids air circulation. Air circulation is further produced by projecting the engine exhaust pipe 62 of the respective engine part way into each nozzle 61 thereby effecting ejector action.

For the purpose of tipping the housings 24 thereby to tip forward the axes about which the rotors 18 rotate, the housing member 27 which connects the sleeves 26, that are in turn fixed to the housings 24, is adapted to be oscillated through various positions, as indicated in Fig. 8. For this purpose, the housing member 27 is provided with a depending hollow leg 65 (Figs. 4, 6 and 8), on one of whose outer faces at the lower end is provided a pocket or guide means 66 which slidably receives a vertically disposed actuating finger 67 pivotally connected at 67a to a grip device 68 holding the ends of a cable 70, which passes around spaced pulleys 71. The movement of the grip 68 is guided in an elongated channel member 72. The cable 70 and the grip 68 are actuated through the medium of an endless cable 73 which passes around a second groove in one of the pulleys 71 and thence around one of a group of pulleys 74 to an actuating pulley 75 secured to a control wheel 76 pivotally mounted upon a shaft 78 secured in the adjacent side wall of the fuselage 15 and provided with a crank handle 79 for other control purposes subsequently to be described.

For the purpose of controlling a driving connection of the engines 30 with their respective rotors 18, each engine is provided with a clutch, such as generally indicated at 80, which is connected with the drive shaft 32. The clutch 80 has a looped yoke 82 (Figs. 4 and 5) operatively connected thereto, the yoke 82 being adapted to be lifted by the elevated portion of a cam member 83 which cooperates with an engaging cam part 84 on the yoke 82 and is rotatable for adjustment purpose through the medium of a hollow shaft 85 mounted within the hollow shaft 35 as through the medium of suitable bearings 86. One shaft 85 extends into the connecting housing 27 and has fixed thereon a bevel gear 87. The bevel gear 87 is engaged by a cooperating bevel gear 88 which is adapted to be actuated through the medium of a sectional control shaft 90 provided with suitable universal joints 92, the sectional shaft 90 extending into the lower portion of the depending leg 65 and being there provided with a worm gear 93 which meshes with a worm 94 on a horizontally disposed shaft 95. The sectional shaft 90 and the shaft 95 are suitably positioned by appropriate bearings not shown. In order to permit oscillation of the depending leg 65 through its various movements, as indicated in Fig. 8, the shaft 95 also is sectional and is provided with suitable universal joints 96 and with a telescopic joint 97 so that as the leg 65 is swung from one position to another to rock the sleeve 25 and the axis of the respective rotor 18, the universal joints may flex and the corresponding portions of the shaft 95 may telescope. The telescopic portions will, for example, be square in order to provide for rotary drive. The shaft 95 extends forward to the pilot's position in the cockpit where its forward end has a bevel gear 98 (Fig. 10) secured thereto, the gear 98 meshing with a double bevel gear 99, one side of which meshes with a segment gear 100 fixedly secured to a rotatable shaft 102 extending upwardly to the pilot's operating level where it is provided with a handle 103 constituting a portion of a multiple maneuvering control device generally indicated at 105.

The above description of a clutch actuating mechanism as applied to one engine 30, also applies to the same construction of clutch mechanism actuating the other engine 30, the parts therefor being indicated by the same reference numerals with the suffix "a." In Fig. 4, the shaft 90a is located behind the shaft 90, and in Fig. 6, the shafts 99 and 90a are located behind other shafts presently to be described.

Located within each hollow drive shaft 85 which controls the respective clutch 80, is a shaft 110 journaled in bearings 111, the shaft 110 carrying a gear 112 meshing with a rack bar 114 which extends upward within the hollow drive shaft 38 for the respective rotor 18 and is operatedly connected to impart rotary adjusting movement to a shaft 115 mounted in a bearing 116 (Fig. 5) and having above the bearing 116 a gear 117 which meshes with segmental gears 118 on both the adjacent ends of the spindles 41 of the blades 42 constituting the rotor 18. As shown in Fig. 5, the rack bar 114 is provided with a head 120 which is connected by a freely rotating bearing 121 with a sleeve 122 having an internal spiral thread 124 meshing with an external spiral thread 125 on the shaft 115. The rack bar 114 is held in engagement with the gear 112 and against rotation with the hollow drive shaft 38 by any suitable bracket means (not shown) connected with the respective housing 24. As the shaft 110 and the gear 112 are rotated, vertical movement of the rack 114 causes corresponding rotation of the shaft 115 by reason of the threads 124 and 125 whereby to adjust the blades 42 about their longitudinal axes and thereby change the pitch of both blades simultaneously.

Actuation of the shaft 110 by the pilot from the control mechanism 105 in the cockpit is obtained through the medium of a bevel gear 130 fixed on the end of the shaft 110 in the connecting housing 27, the gear 130 meshing with a bevel gear 132 mounted on a suitably positioned jointed shaft 134 having universal joints 135. The shaft 134 depends within the leg 65 of the housing 27 and carries on its lower end a worm gear 136 meshing with a worm 137 on a rotary control shaft 138 like the shafts 95 and 95a. The shaft 138 possesses universal joints 139 and a telescopic connection 140, and by these means is operatively connected by bevel gears 142 with a bevel gear 143 on the lower end of a shaft 144 which extends upwardly through a hollow post 145 of the control device 105 and carries on its upper end a wheel 146 adapted for operation by the pilot.

A set of gears and control shafts for adjusting the blades 42 of the other rotor 18 are also provided, these parts corresponding with those just described and bearing the suffix "a." Here, the gear 143a is secured on the lower end of a hollow shaft 150 through which the shaft 144 extends, the shaft 150 carrying on its upper end a control wheel 152 operable by the pilot.

Means are also provided for adjusting the pitch of the blades 56 of the rear stabilizing rotor 20. This is accomplished by means shown in Fig. 7 which is substantially the same as that shown in Figs. 4 and 5 for adjusting the pitch of the blades 42 of the rotors 18. In Fig. 7, a gear 112a mounted on a shaft 160 engages a rack 114a which serves to impart rotary motion to a shaft 115a disposed in the hollow drive shaft 52 and carrying a bevel gear 117a meshing with sector gears 118a secured to the spindles 55 of the blades 56 for oscillating adjustment of the blades 56 about their longitudinal axes. As in the form of Fig. 5, the rack 114a has a freely rotatable connection 121a with a sleeve 122a carrying an internal helical thread engaged with an external helical thread 125a on the shaft 115a. Thus, as the gear 112a is rotated to impart longitudinal motion to the rack 114a and the sleeve 122a, the interengaging of the helical threads causes reciprocal motion of the sleeve 122a to impart rotary motion to the shaft 115a and correspondingly rotate the blades 56. The shaft 160 and the gear 112a are rotated through the medium of a cable 162 and a pulley 164 which receives the cable 162. These parts are positioned by journaling the ends of the shaft 160 in adjacent mountings carried in the tailpiece 22 to which may be connected a bracket 165 which serves to retain the rack 114a in engagement with the gear 112a and also to prevent tendency of the rack 114a to rotate. The cable 162 leads from the tail of the ship about a series of guide pulleys 166 to the front of the ship whence it passes around suitable members of the series of pulleys 74 (Figs. 8 and 9) and thence to a pulley 168 on the shaft 78 carrying the crank handle 79. Thus, by operation of the handle 79, the cable 162 is actuated for proper movement of the gear 112a and the rack 114a to obtain the desired adjustment of the blades 56 of the rear rotor 20.

In the construction illustrated in Fig. 12, a single motor 30a is employed instead of the two motors 30 of the form of Figs. 1 to 11. Here, the motor 30a is appropriately mounted in the fuselage 15 and provided with a driven gear 33a that meshes with the central gear 46, whereby the central gear 46 drives the hollow drive shafts 35 through the medium of the gears 45 and thus drives the rotors 18 through their hollow drive shafts 38 by way of the bevel gears 34 and 36. In these respects, the construction may be identical with that of the other form, except that clutch actuating means for the motor 30a will not be required to extend out to the housings 24, and the housings 24 obviously will not be provided with power plants. However, the same means used in the other form for changing the pitch of the blades 42 of the rotors 18 may be employed.

*Operation*

In operating a helicopter constructed according to the improvements of the present invention, the engines 30 are started in any desired manner, the clutches 80 (Figs. 4 and 5) having been first disengaged. Clutch disengagement is accomplished by the lifting cams 83 operating upon the clutch controlling yokes 82 through the medium of the hollow shafts 85 and the bevel gears 87 (Figs. 4 and 6), the bevel gears 87 being actuated through the bevel gears 88 and 88a, the jointed shafts 90 and 90a, the sectional shafts 95 and 95a, and the gears 98, 98a and 99, 99a from the controls 103 and 103a of the control mechanism 105, shown in Fig. 10.

The engines 30 having been properly warmed, the clutches 80 are engaged by actuation of the controls 103 and 103a whereby rotation of the blades 42 of the power rotors 18 is effected in the direction of the arrows of Fig. 2. The pitch of the blades 42 will have been adjusted to a suitable position, such as that indicated in Fig. 3, for ascent of the ship, the axes of the rotors 18 will have been disposed in vertical position, and the blades 56 of the rear rotor 20 will have been adjusted about their longitudinal axes for proper stabilization of the ship during ascent.

Ascent to a proper height having been effected, forward motion is best accomplished by tipping the axes of the rotors 18 forward, whereby to obtain a proper angle of attack by the blades 42. This is accomplished by tipping the housings 24 so that their upper ends move forward, the motion being accomplished by rotating the sleeves 26 to which the housings 24 are secured through the medium of the connecting housing 27 between the sleeves 26. This adjusting motion is obtained by rocking or oscillating the lower end of the leg 65 of the central housing 27 by adjustment of the cable 70 and the actuating finger 67 through the medium of the cable 73 which leads from one of the pulleys 71 around pulleys of the unit 74 to the pulley 75 which is controlled by the hand wheel 76 adjacent the pilot's position in the cockpit. When the blades 42 of the rotors 18 are properly adjusted about their longitudinal axes for forward flight, the tipping of the rotors 18 bodily forward causes the blades which are moving forward in the common or overlapping portion of the paths of the rotors to move in a substantially horizontal plane. The same adjustment causes the blades to assume a steeper position as they rotate into the outermost portions of their paths, as a result of which the greater angle of attack produces greater propelling action. In other words, the flattened blades passing through the common portion of the paths of the rotors tend to slip forward through the air, whereas the blades moving rearward in the outermost portions of their paths attack the air positively at a steep angle to obtain maximum propelling effect as indicated in Fig. 3a. By reason of the interconnection of the rear rotor 20 by means of the shaft 48 and its connection with the central gear 46, proper stabilization of the tail of the ship is obtained. The permanent tipping forward of the axis of the rotor 20, as indicated in Fig. 1, improves its stabilization effect and at the same time permits at least a limited amount of propulsive work.

Maneuverability of the ship is readily effected by adjustment of the various blades 42 of the power rotors 18 and the blades 56 of the stabilizing rotor 20 about their longitudinal axes. For example, a turn to the right may be accomplished when the axes of the rotors 18 are tipped forward in propelling position by leaving the blades of the left rotor in driving position and rotating the blades of the right rotor about their longitudinal axes so as to reduce the driving effect of the right rotor 18. Such adjustment of the various blades of the righthand rotor 18 about their longitudinal axes is accomplished by actuation of the shaft 110 (Fig. 4) through the medium of the bevel gears 130 and 132, the jointed shaft 134 and sectional shaft 138 by the pilot from the cockpit through the medium of the hand wheel 146 (Fig. 11), the shaft 144 and the gears 142 and 143. Rotation of the shaft 110, as previously described, causes the gear 112 to impart vertical motion to the rack 114 (Figs. 4 and 5) whereby bodily vertical movement of the sleeve 122 (Fig. 5) imparts rotary adjustment to the shaft 115, the bevel gear 117 and the sector gear 118 through the influence of the interengaging helical threads 124 and 125 in the sleeve 122 in the shaft 115. The rotary joint at 121 is such as to permit free rotation of the sleeve 122 upon the head 120 of the rack bar 114 while at the same time imparting vertical movement to the sleeve 122 corresponding with that of the rack bar 114.

For the purpose of turning in the opposite direction, the pilot will turn the wheel 146 (Fig. 11) to restore the blades of the right rotor 18 to driving position, the blades of the left rotor 18 then being adjusted through the medium of the hand wheel 152 to reduce their driving effort. Similarly, the ship may be trimmed by adjusting the blades 56 of the rear rotor 20 about their vertical axes through the medium of the mechanism shown in Fig. 7.

For the purpose of vertical descent, the leg 65 of the housing 27 (Figs. 4 and 8) is restored to an intermediate position so that only lifting effects are obtained, thereby allowing the ship to settle. It is possible, in parking the ship, to move the same rearward to some extent, by tipping the leg 65 in the opposite direction so as to tip the upper ends of the housings 24 and the upper end of the axes of the rotors 18 rearward, this also being accomplished by the pilot from the cockpit through the medium of the hand wheel 76 (Figs. 8 and 9) and the cable 73.

As has been previously indicated, good cooling effects are obtained by the action of the tips of the propellers as they move through the common portion of their paths above the fuselage 15 whereby air is forced at high speed down through the opposite louvers 60 in the opposing sides of the housings 24, circulation continuing past the motors 30 within the housings 24 and thence outward through the nozzles 61, such venting of cool air being facilitated by the ejector effect of the exhaust from the engines through exhaust pipe 62.

By reason of the permanent interconnection between the power rotors 18, the ship may be handled through one engine in the event that the other engine fails, this being accomplished merely by throwing out the clutch of the engine which has failed. Under such circumstances, the rotor whose engine has failed is driven from the other engine by way of the hollow drive shafts 35, the central bevel gear 46 and bevel gears 45 within the connecting housing 27.

Also, by reason of the fact that the lower portions of the housings 24 and of the fuselage 15 are water-tight, the craft may be employed for settling upon water and taking off therefrom as well as for land use.

In the operating the form of Fig. 12, manipulating procedures are substantially the same. In this form, as in the other form, the two power rotors 18 and the stabilizing rotor 20 are all connected by shafts and gears. In this construction, also, the housings 24 are tipped forward to change the angle of attack of the rotors 18 as the pilot desires. Mechanism substantially the same as that for the form of Figs. 1 to 11 is employed for actuating the rotors 18 and 20, and for adjusting their blades about their longitudinal axes. In this form, more than one engine may be employed, so that if one engine fails, it may be disconnected by throwing out its clutch and all rotors 18 and 20 driven by a single engine.

It will become apparent to those skilled in the art that many modifications of the generic invention herein disclosed may be made without departing from the spirit of the invention. Therefore, it is intended that all modifications shall be protected as fall within the scope of the appended claims.

I claim as my invention:

1. In combination in a helicopter: an elongated body having a longitudinal axis; spaced rotors disposed on substantially vertical axes at the opposite sides of said body, said rotors having blades normally in substantially horizontal planes; hollow means extending laterally from said body to support said rotors; housing means connected with the outer ends of said hollow supporting means and directly supporting said rotors; means in said housing means to drive said rotors; clutch means in said housing means to engage and actuate said drive means; clutch operating means extending from said body through said hollow supporting means to control said clutch means; means on the inner ends of said blades to rotate the same about their axes and change their pitch; and rotary drive means disposed on the axes of said rotors to actuate said means for changing pitch.

2. A combination as in claim 1 wherein said rotary drive means includes telescopic, threaded drive connections.

3. A combination as in claim 1 wherein said means on the inner ends of said blades are gears, and said rotary drive means include means to engage and actuate said gears.

4. A combination as in claim 1 wherein said rotary drive means include rack and gear drives.

5. In combination in a helicopter: an elongated body having a longitudinal axis; spaced rotors disposed on substantially vertical axes at the opposite sides of said body, said rotors having blades normally in substantially horizontal planes; hollow means extending laterally from said body to support said rotors; housing means connected with the outer ends of said hollow supporting means and directly supporting said rotors; motors mounted in said housings to drive said rotors respectively; vent means in said housings; and upwardly directed louver means in said housings to receive descending air currents from said rotor blades, the tips of the blades of each rotor being arranged to pass close to said louver means of the opposite housing.

PAUL M. LEWIS.

REFERENCES CITED

The following references are of record in the file of this patent:

UNITED STATES PATENTS

| Number | Name | Date |
|---|---|---|
| 1,838,327 | Salisbury et al. | Dec. 29, 1931 |
| 1,849,766 | McGuire | Mar. 15, 1932 |
| 1,878,955 | Mantell | Sept. 20, 1932 |
| 1,892,036 | Campens | Dec. 27, 1932 |
| 2,082,376 | Boettner | June 1, 1937 |
| 2,186,992 | Reinhard et al. | Jan. 16, 1940 |
| 2,321,572 | Campbell | June 15, 1943 |
| 2,375,592 | Smith | May 8, 1945 |

FOREIGN PATENTS

| Number | Country | Date |
|---|---|---|
| 317,059 | Great Britain | Feb. 9, 1931 |
| 502,335 | France | Feb. 19, 1920 |